US007684880B2

(12) United States Patent
Bach

(10) Patent No.: US 7,684,880 B2
(45) Date of Patent: Mar. 23, 2010

(54) FUEL CELLS SERVICE METHOD AND APPARATUS

(75) Inventor: Mark C. Bach, Gurnee, IL (US)

(73) Assignee: Snap-On Technologies, Inc., Lincolnshire, IL (US)

( * ) Notice: Subject to any disclaimer, the term of this patent is extended or adjusted under 35 U.S.C. 154(b) by 1560 days.

(21) Appl. No.: 10/701,419

(22) Filed: Nov. 6, 2003

(65) Prior Publication Data

US 2005/0100766 A1 May 12, 2005
US 2005/0181243 A2 Aug. 18, 2005

(51) Int. Cl.
*G05B 9/02* (2006.01)
*G05D 3/12* (2006.01)
*G06F 11/30* (2006.01)
*G06F 11/00* (2006.01)
*H01M 8/00* (2006.01)

(52) U.S. Cl. ......................... 700/79; 700/287; 700/292; 702/183; 702/188; 429/12; 715/961

(58) Field of Classification Search .................. 700/28, 700/32, 49, 51, 52, 54, 79, 80, 81, 83, 87, 700/281, 282, 283, 285, 286, 287, 292; 702/45, 702/51, 55, 58, 183, 184, 185, 188; 429/12, 429/13, 22–25; 715/700, 740, 961, 965
See application file for complete search history.

(56) References Cited

U.S. PATENT DOCUMENTS 5,763,113 A * 6/1998 Meltser et al. ................ 429/13
6,141,608 A 10/2000 Rother
6,615,120 B1 9/2003 Rother
6,850,820 B2 * 2/2005 Tajima ....................... 700/286
2002/0087220 A1 * 7/2002 Tveit et al. .................... 700/22
2002/0106537 A1 8/2002 Saito
2003/0141188 A1 7/2003 Imamura et al.
2005/0012638 A1 * 1/2005 Barbir et al. ........... 340/870.01

FOREIGN PATENT DOCUMENTS

EP 1 339 125 A2 8/2003

OTHER PUBLICATIONS

Snap-on D-Tac Plus Diagnostic Tester and Charger Operating Instructions Uder's Manual © 2003, pp. EN-1-FR24.
Snap-on MT2500 Scanner™ User's Manual Mar. 2004, pp. ii-68.
Snap-on MicroVAT™ User's Manual EECS304B1 © 2005, pp. 1-51.
Snap-on MicroVAT™ User's Manual EECS304B2 © 2005, pp. 1-51.
Snap-on MODIS™ Display User's Manual Mar. 2006, pp. ii-98.
Oxford Paperback Reference, "A Concise Dictionary of Chemistry" New Edition, 2pgs, pp. 128-129.

* cited by examiner

*Primary Examiner*—Sean P Shechtman
(74) *Attorney, Agent, or Firm*—McDermott Will & Emery LLP

(57) ABSTRACT

Embodiments for servicing a system including a fuel cell and at least one sensor. In one embodiment, the at least one sensor is implemented for generating information indicative of operation of the system. The information is communicated to a tool operatively connected with the system. The information is evaluated to determine if the system is operating as intended. Based on the information, a recommendation for returning the system to intended operation is determined. The recommendation is performed. The first three steps are repeated until the system is operating as intended.

2 Claims, 2 Drawing Sheets

FUEL CELLS SERVICE METHOD AND APPARATUS

BACKGROUND

Embodiments described below relate generally to fuel cell service, repair and diagnostics methods and apparatus. Specifically, the embodiments relate to service, maintenance, repair and diagnostic methods and apparatus for diagnosing hydrogen fuel cells and to tools for performing such functions.

As fuel cells become used more widely, for instance in vehicles, household appliances and the like, it is desirable to provide methods and apparatus for servicing and diagnosing the fuel cell. In this manner, it is possible to increase performance of the fuel cell and associated user satisfaction.

SUMMARY

Embodiments detailed herein describe methods of and apparatus for of servicing a system including a fuel cell and at least one sensor. One such method comprises at least one sensor generating information indicative of operation of the system. The information is communicated to a tool operatively connected with the system. The information is evaluated to determine if the system is operating as intended. Based on the information, a recommendation for returning the system to intended operation is determined. The recommendation is performed. The first three steps are repeated until the system is operating as intended.

An apparatus for servicing a system including a fuel cell and at least one sensor operatively connected with the system may comprise a data processor, a data communication port for establishing signal communication with the at least one sensor, and a data storage device for storing instructions. The instructions, when executed by the data processor, control the apparatus to receive information indicative of operation of the fuel cell obtained by the at least one sensor via the data communication port. The apparatus then evaluates the information to determine if the fuel cell is operating as intended. If not, the apparatus determines a recommendation for returning the fuel cell to its intended operation.

DETAILED DESCRIPTION

Figure 1:
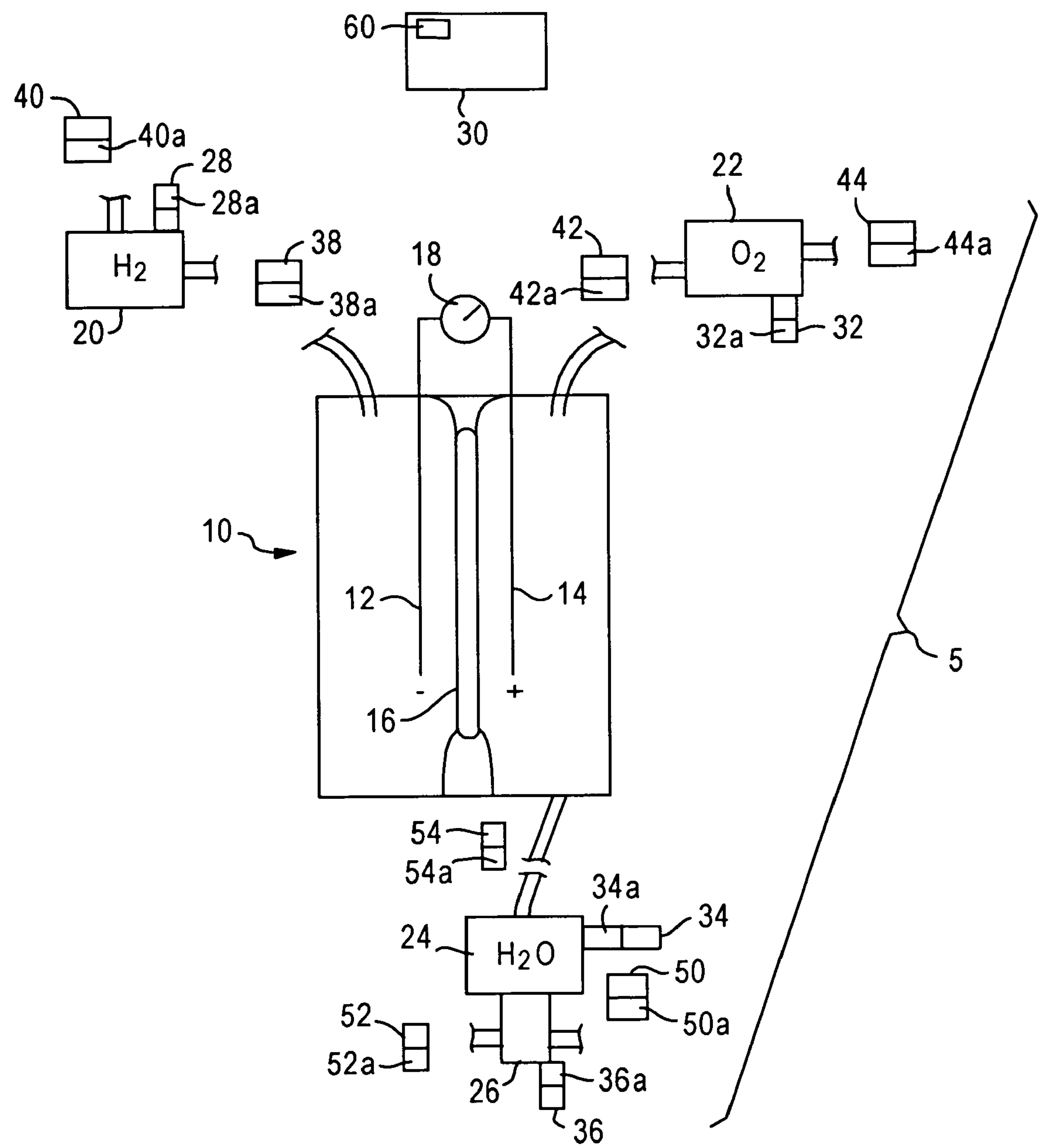
FIG. 1 is a diagrammatic view of an electric system incorporating a hydrogen fuel cell.

System 5 of FIG. 1 represents an electric system, in essence, a system 5 that uses electric energy. While embodiments will be described below, for the sake of clarity, with respect to utilization with a hydrogen fuel cell, it is to be recognized that the embodiments may be utilized with any appropriate energy generating, converting or using device. Thus, the embodiments are not to be limited to application with a hydrogen fuel cell. Further, while a general description of a hydrogen fuel cell follows, it is to be remembered that other constructions and operations of the hydrogen fuel cell are possible.

A fuel cell 10 generally comprises a first electrode 12 separated from a second electrode 14 by a spacer 16. Composition and construction of the electrodes 12 and 14 and the spacer 16 are chosen to facilitate functionality of the fuel cell 10. For instance, in one embodiment, the electrode 12 may be sufficiently "porous" to permit passage of hydrogen while the electrode 14 may be sufficiently "porous" to permit passage of oxygen. A negative electric charge may be present on electrode 12 and a positive electric charge may be present on electrode 14. The spacer 16 may comprise a structure and material, such as a catalyst and the like, that encourages function, in this case production of electric current, heat and water, of the fuel cell 10. While only one combination of electrodes 12 and 14 and spacer 18 is shown here, further combinations can be added in well known manner to increase function and output of the fuel cell 10.

The first electrode 12 is electrically connected to the second electrode 14 by a device 18. The device 18 completes an electric circuit with the first electrode 14 and the second electrode 16 such that electric current flows from the first electrode 12 to the second electrode 16. The device 18 can be anything that uses electric current. Some examples of the device 18 include, but are not limited to, a vehicle, a household appliance, a refrigerator, a television set, a computer, elements of a vehicle, such as a vehicle engine, a radio, and the like. Of course, multiple devices 18 can be used in series or in parallel either simultaneously or at different times.

A supply 20 of hydrogen and a supply 22 of oxygen are provided to the fuel cell 10. Both the supply 20 and the supply 22 are appropriately connected with the fuel cell 10 such that both hydrogen and oxygen are provided to the fuel cell 10 at appropriate locations to enable flow of electric current through device 18. As the electric current flows through device 18, the fuel cell 10 also produces heat and water. The water can be collected at store 24 that is appropriately connected with the fuel cell 10. The heat can be collected or dissipated by suitable means. It is envisioned that, in some embodiments, the store 24 may include appropriate generation means 26, such as electrolysis apparatus and the like, to generate hydrogen and oxygen from the collected water. In other embodiments, the generated heat may be used to generate hydrogen and oxygen from the generated water. The generated hydrogen and oxygen can be conveyed to appropriate supplies 20 and 22.

A user of the system 5 desires intended operation of device 18. For the sake of clarity, it is assumed that the device 18 operates as intended if electric current flows between the first electrode 12 and the second electrode 14, that is, the fuel cell 10 is operating sufficiently to provide electric current to the device 18. There may be many reasons for insufficient operation of the fuel cell, leading to unmet desires of the user. For the sake of illustration, some of those reasons may include an electrical fault associated with the fuel cell 10, insufficient flow of hydrogen or oxygen from the supply 20 or the supply 22, insufficient flow of water to the store 24, device 18 problem, and the like. Of course, there may be other reasons.

Sensors may be provided at appropriate locations in and operatively connected with the system 5 to monitor operation of the system 5. Each sensor generates information indicative of operation of at least a portion of the system 5. Each sensor may include an appropriate communicator to relay information from the sensor to a tool 30. The tool 30 may be located proximally to or remotely from the system 5 and can include a display, a data entry device, such as a key, a keyboard and the like, and a communications port. In some embodiments, the tool 30 may be capable of being hand held. The communicator and the communications port may be a phone terminal, an internet terminal, a wireless (microwave, satellite, WiFi, Bluetooth, 802.11 and other formats) terminal, a wired terminal and the like. The communicator and the communications port may enable unidirectional, bi-directional or omnidirectional communication, e.g. between tool 30 and sensor, between tool 30 and a central monitor, among multiple tools 30 etc. The tool 30 includes appropriate memory 60 including software described below.

The following discussion highlights some exemplary employments of a tool 30 with a sensor in the system 5. Other employments are possible.

A sensor 28, including a terminal 28*a*, is operatively connected with the supply 20. For example, the sensor 28 may monitor purity of hydrogen in supply 20. The sensor 28 may also monitor volume of hydrogen in the supply 20 thereby enabling detection of a leak from the supply 20. Information detected by sensor 28 can be relayed by terminal 28*a* to any desired location. For example, the terminal 28*a* may enable viewing of the information on a display located proximally to the system 5, transmit the information via appropriate means to a remote location, or send the information to the tool 30, described in further detail later.

Sensor 32 and terminal 32*a*, possibly similar to sensor 28 and terminal 28*a* with appropriate modification, are operatively connected with the supply 22. For example, the sensor 32 may monitor purity of oxygen in supply 22. The sensor 32, may also monitor volume of oxygen in the supply 22 thereby enabling detection of a leak from the supply 22. Information detected by sensor 32 can be relayed by terminal 32*a* to any desired location. For example, the terminal 32*a* may enable viewing of the information on a display located proximally to the system 5, transmit the information via appropriate means to a remote location, or send the information to the tool 30.

Sensor 34 and terminal 34*a*, possibly similar to sensor 28 and terminal 28*a* with appropriate modification, are operatively connected with the store 24. For example, the sensor 34 may monitor purity of water in store 24, possibly indicating function of the fuel cell 10. The sensor 34 may also monitor volume of water in the store 24 thereby enabling detection of a leak from the store 24. Information detected by sensor 34 can be relayed by terminal 34*a* to any desired location. For example, the terminal 34*a* may enable viewing of the information on a display located proximally to the system 5, transmit the information via appropriate means to a remote location, or send the information to the tool 30.

Sensor 36 and terminal 36*a*, possibly similar to sensor 28 and terminal 28*a* with appropriate modification, are operatively connected with the means 26. For example, the sensor 36 may monitor operation of generation of hydrogen and oxygen. Information detected by sensor 36 can be relayed by terminal 36*a* to any desired location. For example, the terminal 36*a* may enable viewing of the information on a display located proximally to the system 5, transmit the information via appropriate means to a remote location, or send the information to the tool 30.

A sensor and terminal, possibly similar to sensor 28 and terminal 28*a* with appropriate modification, may be operatively connected with a fluid conveying conduit to monitor fluid flow, e.g. flow rate, volume, etc., within that conduit. The sensor can be disposed at any appropriate location along the conduit. For instance, a sensor can be disposed on a conduit conveying hydrogen to the fuel cell 10 and may be positioned adjacent the fuel cell 10, adjacent the supply 20, or at any place between the fuel cell 10 and the supply 20.

Using the illustrated example to facilitate understanding, sensor 38 and terminal 38*a* are disposed between fuel cell 10 and supply 20. Sensor 40 and terminal 40*a* are disposed at an input to the supply 20. Sensor 42 and terminal 42*a* are disposed between fuel cell 10 and supply 22. Sensor 44 and terminal 44*a* are disposed at an input to supply 22. Sensor 50 and terminal 50*a* are disposed between means 26 ad supply 22. Sensor 52 and terminal 52*a* are disposed between means 26 and supply 20. Sensor 54 and terminal 54*a* are disposed between store 24 and the fuel cell 10. Greater or fewer sensors and terminals may be utilized and the dispositions thereof may vary.

The tool 30 can be operatively connected with the terminals such that information from the sensors is sent to the tool 30. Alternatively, the tool 30 may be operatively directly connected with the electric circuit comprising the system 5. Operative connection of the tool 30 can permit servicing of the system 5. In some embodiments, the tool 30 is substantially similar, with appropriate modification, to existing tools, such as the SCANNER™ scan tool, the DTAC™ unit, the MICROVAT™ device, the MODIS™ system and the like. As those tools are commercially available from Snap-on Incorporated (Kenosha, Wis.), their details, specifications, components and operations are incorporated herein in their entirety. The tool 30 may also include software and other information generated, collected and/or organized in a manner substantially similar to that described in U.S. Pat. Nos. 6,141,608 and 6,615,120, both assigned to the assignee of the present case and incorporated herein in their entireties. The tool 30 may be used in a manner substantially similar to that described in those patents. It is to be remembered that the tool 30 may be located adjacent the system 5 or remote from the system 5.

Further details of the tool 30 are described in the following exemplary discussion of operation. To monitor the system 5, the tool 30 is operatively connected with the system 5. This connection allows the tool 30 to obtain information from the sensors. In some cases, the tool 30 may be operatively connected with the system 5 continuously. The form of the connection may depend on the terminals. Thus, the connection made may depend on the particular sensor involved. The tool 30 can display the information whether the tool 30 is proximate to the system 5 or remote from the system 5, thereby facilitating repair, service, maintenance and diagnosis (collectively referred to herein as service) of the system 5. The tool 30 allows display of information from any selected sensor or sensors. In some embodiments, the tool 30 may be substantially similar to a computer, possibly continuously or periodically connected with all or a subset of the sensors. The tool 30 may have memory including appropriate software. The memory may store information, i.e. information history, from the sensor(s) and may include programs for facilitating service of the system 5. The memory may include recommendations for servicing the system 5.

Figure 2:
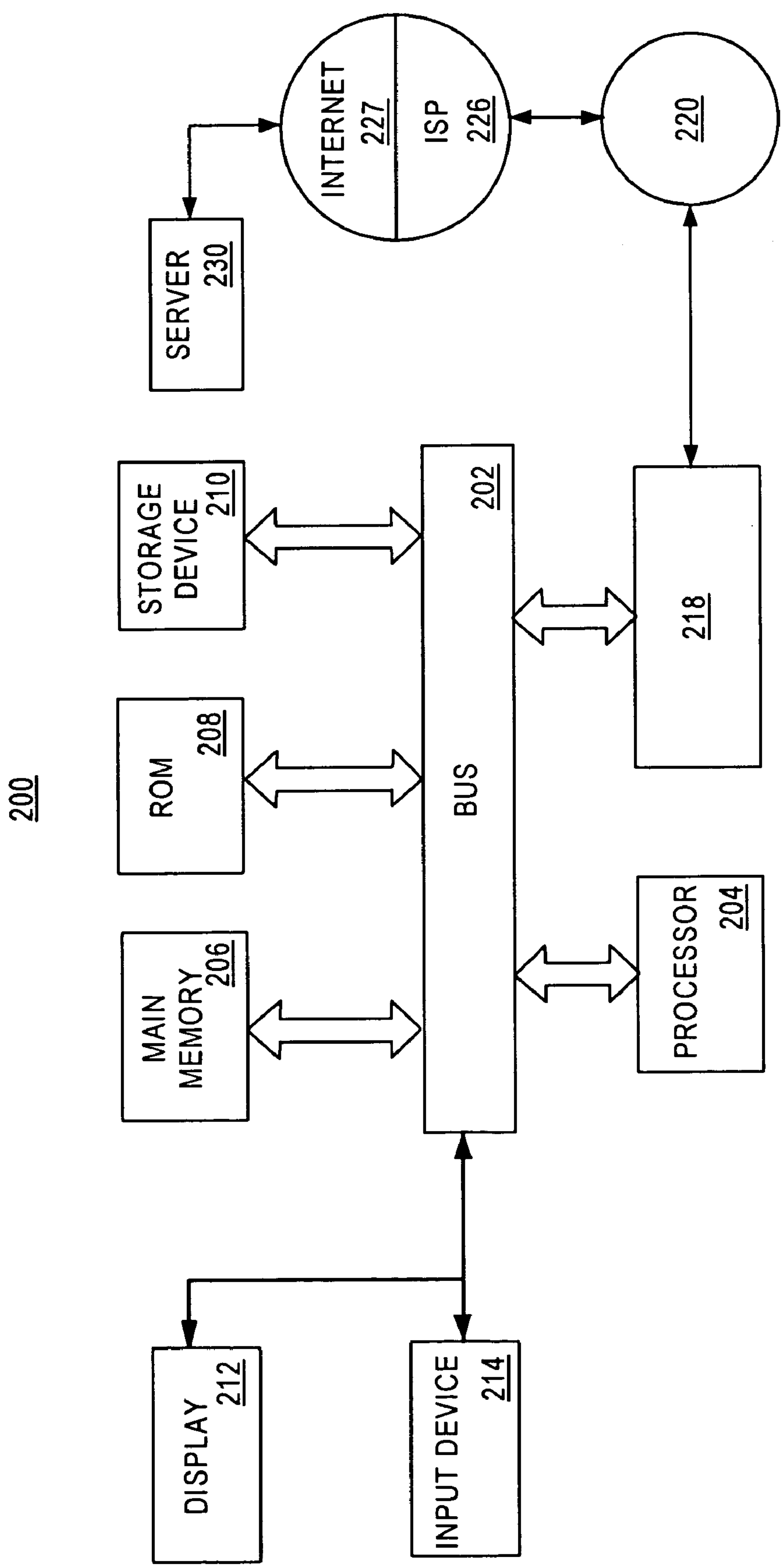
FIG. 2 depicts a computer upon which an exemplary tool may be implemented.

FIG. 2 shows a block diagram of an exemplary computer 200 upon which the tool 30 may be implemented. The computer 200 includes a bus 202 or other communication mechanism for communicating information, and a data processor 204 coupled with bus 202 for processing data. The computer 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by data processor 204. Computer 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions. The computer 200 and/or any of the sensors and/or terminals may also have suitable software and/or hardware for converting data from one format to another. An example of this conversion operation is converting format of data available on the system 5 to another format, such as a format for facilitating transmission of the data.

The computer 200 may be coupled via bus 202 to a display 212, such as a cathode ray tube (CRT) or liquid crystal display (LCD), for displaying information to an operator. An input device 214, including alphanumeric and other keys, is coupled to bus 202 for communicating information and command selections to processor 204. Another type of user input device is cursor control (not shown), such as a mouse, a trackball, or cursor direction keys and the like for communicating direction information and command selections to processor 204 and for controlling cursor movement on display 212.

The computer 200 is controlled in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the disclosure. Thus, embodiments of the disclosure are not limited to any specific combination of hardware circuitry and software.

The term "machine readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio wave and infrared data communications.

Common forms of machine readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote data processing system, such as a server. The remote data processing system can load the instructions into its dynamic memory and send the instructions over a telephone line using a modem. A modem local to computer 200 can receive the data on the telephone line and use an infrared transmitter to convert the data to an infrared signal. An infrared detector can receive the data carried in the infrared signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer 200 also includes a communication interface 218 coupled to bus 202. Communication interface 218 provides a two-way data communication coupling to a network link 220 that is connected to a local network. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network to data equipment operated by an Internet Service Provider (ISP) 226. ISP 226 in turn provides data communication services through the world large packet data communication network now commonly referred to as the Internet 227. Local network and Internet 227 both use electrical, electromagnetic or optical signals that carry digital data streams. The signals through the various networks and the signals on network link 220 and through communication interface 218, which carry the digital data to and from computer 200, are exemplary forms of carrier waves transporting the information.

The computer 200 can send messages and receive data, including program code, through the network(s), network link 220 and communication interface 218. In the Internet example, a server 230 might transmit a requested code for an application program through Internet 227, ISP 226, local network and communication interface 218.

The computer 200 also has various signal input/output ports for connecting to and communicating with the measurement heads, peripheral devices and/or the scanner, analyzer circuits, and/or other test circuits, connectors, cables, leads, probes, etc. The input/output ports may include USB port, PS/2 port, serial port, parallel port, IEEE-1394 port, infra red communication port, etc., and/or other proprietary ports. The computer 200 may communicate with the sensors and/or other computers via such signal input/output ports.

Illustrating further by example, the device 18, and thereby the system 5 are not operating as intended. The tool 30 is operatively connected with the system 5 to obtain and to review information from all sensors in the system 5. Alternatively, information from a subset of all of the sensors can be obtained by the tool 30 and reviewed. The subset of all the sensors may be identified in software running on the tool 30. The software may include a routine whereby status of the device 18 can be entered and, based on that entry, the subset of sensors of interest is identified based upon experience previously entered in the software. The software may also include a service and/or repair recommendation for improving operation of the device 18. This aspect may become clearer further in this example.

The sensor information can be reviewed by a service technician who may be located proximally to or remotely from the system 5. Based on that sensor information, the technician can determine why the device 18 is not operating as intended. For example, the information from sensor 28 may indicate that status of the hydrogen supply 20 is not within acceptable parameters. The acceptable parameters can be present, such as in a look-up table and the like, in the software operating on the tool 30 thereby facilitating determination of this condition. Based on this determination, the software can present at least one service recommendation to the technician. The recommendation can include sufficient detail to "lead", possibly step by step, the technician through a service procedure. If multiple recommendations are applicable, as determined by the software, the recommendations can be ranked and displayed on the tool 30 in a manner substantially similar to that described in the above-referenced U.S. Pat. Nos. 6,141,608 and 6,615,120. Upon performance of the recommendation, sensor information can be communicated to the tool 30 again. The information is evaluated as before to determine operation of the system 5. Based on this "updated" sensor information, if the system 5 is still not operating as intended, the tool 30 can produce another recommendation, possibly different from the prior recommendation. This recommendation is performed and sensor information can be utilized as before. This process can be repeated until the system 5 and the device 18 return to intended operation.

In some embodiments, the above steps may be performed by machine, such as a computer, a robot and the like. In some embodiments, sensors may provide information substantially continuously to the tool 30 and software present in the memory of the tool 30 can periodically determine if the system 5 is operating as intended.

In another alternative, the technician may determine that performing the recommendation does not return the device 18 to intended operation. The technician may employ a service and/or repair method different from the recommendation to return the device 18 to intended operation. The technician can use the tool 30 or other appropriate means to enter a description of the different method. The description contains all details, such as make and model numbers of elements of the system 5, physical location of the system 5, system 5 ambient conditions, tools used, sensor identification and information etc., relevant to the method—essentially, all details needed to reproduce the method.

The description can be verified and validated, such as by a third party, to determine appropriateness of the description. The tool 15 may transmit the description directly to a remote server via a data network, such as the internet, for verification and validation. The verified and validated description can be incorporated into the software as a recommendation so that future substantially similar occurrences can utilize the method. The validated description may be packaged as an update patch and sent to the tool 15 as well as other tools via network connections. The tool 15, upon receiving the validated description, executes an installation or update process to incorporate the validated description into the software. Alternatively, updated software incorporating the validated description may be sent to the tool 15 for installation. The software may be sent by internet or recorded on a data storage medium, such as CD-ROMs or cartridge, and distributed to users for installing on tool 15.

The foregoing descriptions of various embodiments have been presented for purposes of illustration and description. It is not intended to be exhaustive or to limit to the precise form disclosed, and modifications and variations are possible in light of the above teachings. The embodiments were chosen or described in order to enable one of ordinary skill in the art to utilize the systems and methods with various modifications as would be suited to a particular use as contemplated. It is intended that the scope of the various embodiments be defined by the claims appended hereto, and their equivalence.

What is claimed is:

1. A method of servicing a system including a fuel cell and at least one sensor operatively connected with the system, the method comprising the steps of:

(a) generating information indicative of operation of the system;

(b) communicating the information to a tool operatively connected with the system;

(c) evaluating the information to determine if the system is operating as intended;

(d) determining a recommendation for returning the system to intended operation;

(e) entering into the tool a description of a method for returning the system to intended operation;

(f) obtaining a verification of the description;

(g) incorporating the verification as a recommendation; and (h) performing the recommendation such that the system is operating as intended.

2. A method as defined in claim 1 further comprising the steps of:

(i) incorporating the verified description in the tool.

* * * * *